Figure 1:
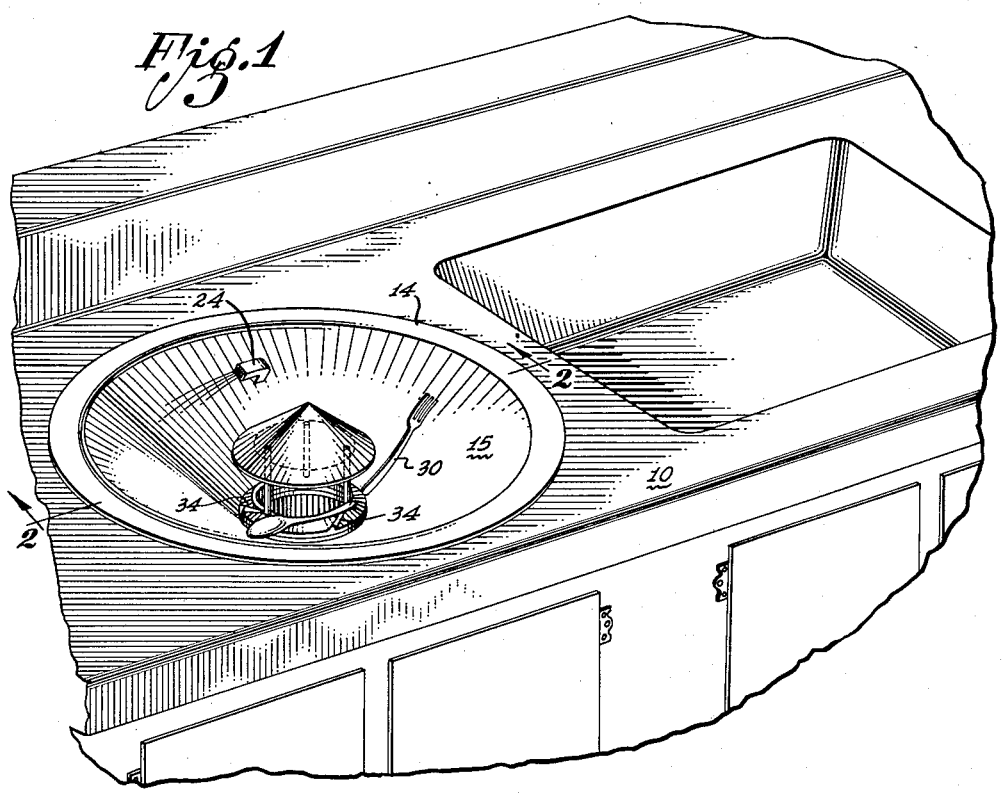

Sept. 8, 1959  J. W. CHAMBERS  2,902,700
SINK STRUCTURE FOR GARBAGE DISPOSERS
Filed Jan. 17, 1957

INVENTOR:
Joseph W. Chambers

By Smyth & Roston
Attorneys

2,902,700
SINK STRUCTURE FOR GARBAGE DISPOSERS

Joseph W. Chambers, Inglewood, Calif., assignor to Big Genie Corporation, Los Angeles, Calif., a corporation of California Application January 17, 1957, Serial No. 634,717

5 Claims. (Cl. 4—187)

This invention relates to a sink structure for feeding food scraps into the intake port of a garbage disposal unit and is directed to the solution of certain problems that arise in the use of such a sink structure. While features of the invention are adaptable for use with household garbage disposal units, the invention has special utility for commercial garbage disposal installations, for example, in restaurants and in institution kitchens. Such a commercial embodiment of the invention has been selected for the present disclosure and will provide adequate guidance for those skilled in the art who may have occasion to embody the underlying principles of the invention in other specific devices.

One of the problems in the use of a commercial garbage disposal unit is to prevent such metal objects as pieces of silverware from being fed into the unit mechanism. Typically such a sink structure comprises a receptacle having walls that slope downward to an outlet that communicates with the intake port of the disposal unit and water is fed to the receptacle in a swirling manner that funnels the food scraps into the disposal unit. If a piece of silverware is inadvertently dropped into the receptacle it slides quickly down the sloping walls into the disposal unit with the result that the mechanism of the unit is damaged and, of course, the piece of silverware is ruined.

The invention meets this problem by providing an annular barrier around the outlet of the sink srtucture with the barrier protruding above the lower end of the sloping wall of the receptacle to form therewith an annular trough around the outlet. If a piece of silverware is dropped into the receptacle and slides endwise down the sloping receptacle wall it is stopped by impact against the barrier and comes to rest in the surrounding trough where it can be readily retrieved.

A feature of the invention is that the annular barrier has an upwardly sloping top surface at an abrupt angle relative to the slope of the receptacle wall. Thus the annular barrier serves as an effective stop for silverware, but, nevertheless, water flows smoothly and readily over the sloping surface of the barrier to the receptacle outlet. A further feature of the invention is the provision of upwardly projecting ribs on the annular barrier positioned to divert the flowing water over the barrier. By virtue of these deflecting ribs scraps of food are readily swept into the garbage disposal unit without appreciable interference by the annular barrier.

While such an annular barrier stops pieces of silverware that slide substantially endwise down the sloping wall of the sink receptacle it may not be effective against pieces of silverware that slide down sidewise and, moreover, the annular barrier does not prevent silverware and other objects from being dropped vertically directly into the garbage disposal unit. As a safeguard against both of these possibilities, the invention further provides a sloping elevated guard member that overhangs the annular barrier and is carried by vertical supports. The vertical supports are distributed around the receptacle outlets with the spacing of the successive supports less than the length of a piece of silverware. Thus, a piece of silverware that slides sidewise down the sloping receptacle wall is stopped by a pair of the spaced supports of the elevated guard and any objects that are released directly above the outlet and deflected by the elevated guard to the sloping side walls of the receptacle.

A third problem encountered in the use of such a sink structure for a commercial installation is to intercept the splash of liquids caused by operation of the disposal mechanism and especially to intercept flying objects such as bone fragments that are thrown back by the disposal unit mechanism. A fourth problem is to prevent easy access to the intake of the garbage disposal unit to keep the user from inadvertently inserting his fingers into the mechanism. These two further problems are met by so dimensioning and locating the elevated guard as to intercept anything thrown back by the disposal mechanism and to make it extremely difficult for the user to place his fingers in the disposal mechanism.

A further problem that is encountered in the provision of the described guard arrangement is to make the structure easy to clean. In this regard a feature of the invention is the concept of mounting the elevated guard by vertical supports on the annular barrier itself, and simply resting the annular barrier in a removable manner in the bottom of the receptacle. Thus all of the guard structure is united in a single unit that may be readily lifted out of the sink receptacle. This unit is easy to clean by virtue of having a smooth configuration with no crevices to trap foreign material. When the unitary structure is removed all of the inner surfaces of the sink receptacle are exposed for cleaning.

A further feature of the invention is that it facilitates the jarring loose of food scraps from dishes without damage to the dishes. There is always a temptation for the user of such a sink device to jar a dish or piece of silverware against some fixed surface to dislodge food scraps. For this purpose the elevated guard has an upper surface of yielding rubber-like material such as Neoprene against which dishes may be jarred without damage.

The various features and advantages of the invention may be appreciated from the following detailed description, considered with the accompanying drawing.

Figure 2:
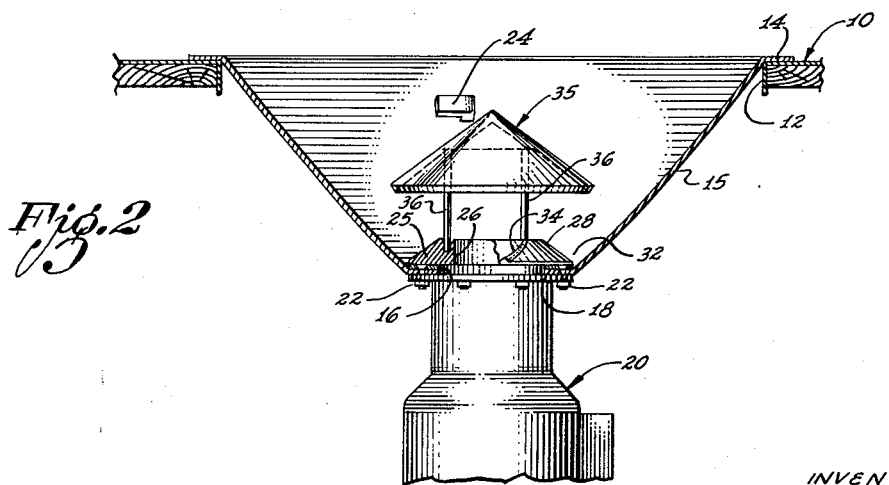

In the drawing, which is to be regarded as merely illustrative:

Figure 1 is a perspective view of the presently preferred embodiment of the invention installed in the top of a dishtable; and Figure 2 is an enlarged section of the new sink structure along the line 2—2 of Figure 1.

Figure 1 shows a conventional dishtable 10 to which dishes and silverware are brought to be rid of food scraps in preparation for a washing operation. The dishtable has an aperture 12 in which the sink structure of the present invention is mounted. The sink structure may comprise a sheet metal receptacle having a radial flange 14 to rest on the rim of the table opening 12 and having a conically curved peripheral wall 15 that slopes downwardly and inwardly to a circular outlet 16 in the bottom of the receptacle. The peripheral wall 15 is turned horizontally inward to form a flat wall portion 18 surrounding the outlet 16 and this flat wall portion is connected to the upper end of a garbage disposal unit 20 by suitable bolts 22 around the intake port of the unit.

In the normal use of such a sink structure a stream of water is provided to flush the food scraps to the receptacle outlet 16 for introduction into the intake port of the garbage disposal unit. For this purpose, the sink structure may be provided with a water inlet nozzle 24 that is pointed in one circumferential direction to cause the stream of water to swirl around the sloping peripheral wall 15 with the vortex converging on the receptacle outlet 16.

The structure described to this point is more or less conventional. The present invention provides an annular barrier in the form of a heavy metal ring 25 that rests on the flat wall portion 18 surrounding the outlet 16. This metal ring projects upward from the lower end of the peripheral wall 15 and forms a short cylindrical passage 26 that is aligned with and leads directly into the intake port of the disposal unit 20.

Preferably, the barrier ring 25 has a conically curved top surface 28 that slopes upward to the entrance of the cylindrical passage 26. It can be seen in Figure 2 that the surface 28 slopes at an abrupt angle relative to the peripheral wall 15, the relative angle being on the order of 90 degrees. It is apparent, therefore, that the sloping barrier surface 28 is an effective stop for any piece of silverware that slides endwise down the sloping peripheral wall 15. Figure 1 shows how a fork 30 is brought to a stop by endwise impact against the barrier. The barrier ring cooperates with the peripheral wall 15 to define an annular trough 32 in which such objects of relatively high density come to rest and from which the objects may be readily retrieved.

Although the sloping surface 28 of the barrier ring 25 serves as an effective stop for metal objects, it is, nevertheless, conducive to smooth water flow over the barrier into the short passage 26 and through the outlet 16 into the intake port of the garbage disposal unit 20. In the particular construction shown, the flow of the swirling water over the barrier ring 25 is facilitated by a plurality of ribs 34 that are integral with the barrier ring and project upward from the sloping surface 28 of the ring. These ribs 34 are positioned at an angle to deflect the swirling water smoothly up over the inclined surface 28 into the interior of the barrier ring. If desired, the ribs 34 may be of slight helical curvature for progressive diversion of the swirling water.

An elevated guard 35, which is preferably of conical configuration with a downwardly sloping upper surface is mounted in a suitable manner at substantial spacing above the barrier ring 25. In the construction shown the elevated guard 35 is mounted on vertical supports in the form of metal rods 36, the lower ends of which are rigidly attached to the barrier ring 25. The elevated guard 35 has an upper surface of resilient rubber-like material and for this purpose the elevated guard may comprise a molded body of the rubber-like material with suitable re-enforcement structure embedded therein (not shown), the vertical rods 36 being rigidly attached to the re-enforcement structure.

The manner in which the described invention serves its purpose may be readily understood from the foregoing description. During operation of the device the nozzle 24 continuously directs a stream of water onto the conical peripheral wall 15 of the sink receptacle and the released water swirls around the conical interior of the sink receptacle with a flushing action that carries any scraps of food down the conical wall 15 and over the barrier ring 25 into the garbage disposal unit 20. A piece of silverware dropped into the sink receptacle is stopped by the periphery of the barrier ring 25 if the piece of silverware slides endwise down the conical peripheral wall 15. If the piece of silverware turns sidewise, it may slide up the barrier ring 25 but will be blocked by at least one of the vertical support rods 36.

Any dishware having particles of food clinging thereto may be jarred safely against the rubber-like surface of the elevated guard 35 without danger of damage to the dishware. The inclination of the upper surface of the elevated guard tends to cause such dislodged scraps of food to drop into the swirling stream of water to be washed thereby into the garbage disposal unit.

If a piece of silverware or other object is dropped vertically in alignment with the intake port of the garbage disposal unit, the object will strike the rubber-like surface of the elevated guard 35 to be deflected away from the entrance to the garbage disposal unit. It is also apparent that the elevated guard 35 will intercept liquid splash from the interior of the garbage disposal unit and will also intercept solid objects such as bone fragments that may be thrown back by the mechanism of the garbage disposal unit. It will also be noted that the overhang of the elevated guard 35 and its spacing relative to the barrier ring 25 are such that the elevated guard makes it extremely difficult if not impossible for the user of the device to insert his hand into the mechanism of the garbage disposal unit.

When it comes time to clean out the sink structure at the end of an operation run, it is a simple matter to lift the elevated guard 35 and barrier ring 25 attached thereto for removal bodily from the interior of the sink receptacle. The swirling stream of water from the nozzle 24 may then be employed to wash out the interior of the receptacle. The unit comprising the elevated guard 35 and the barrier ring 25 is cleaned separately. The unit may be effectively cleaned by simply holding it under a stream of hot water from a faucet.

My description in specific detail will suggest various changes, substitutions and other departures from my disclosure within the spirit and scope of the appended claims.

I claim:

1. A guard for use in a sink having an outlet connected to a garbage disposal unit to keep silverware out of the outlet while permitting food scraps to be carried into the outlet by flowing water, comprising: a ring-shaped member of substantial thickness to rest removably in the sink in position surrounding the sink outlet to serve as a barrier to keep pieces of silverware from sliding edgewise into the outlet; a substantially impervious guard member of an overall size greater than the opening of the ring-shaped member; and at least one support element carried by said ring-shaped member for mounting said guard member over said ring-shaped member to prevent objects from dropping directly through the opening of the ring-shaped member from levels above the guard member and to intercept material thrown upwardly through said opening by the mechanism of the garbage disposal unit.

2. A guard as set forth in claim 1 in which said ring-shaped member is formed with an inwardly and upwardly directed circular outer wall surface having upwardly projecting ribs thereon to direct water upwardly and over said ring-shaped member.

3. A guard for use in a sink having an outlet connected to a garbage disposal unit to keep silverware out of the outlet while permitting food scraps to be carried into the outlet by flowing water, comprising: an annular member of substantial thickness having an opening substantially equal in size and shape to the size and shape of the opening of the outlet, said member to be positioned in the sink with the opening thereof aligned with the opening of the outlet to serve as a barrier to keep pieces of silverware from sliding edgewise into the outlet; a guard member of conical configuration having a diameter at the base thereof greater than the diameter of the opening of said annular member; and at least one support element carried by and projecting upwardly from said annular member for mounting said guard member over said annular member in a substantially concentric relationship therewtih.

4. A guard for use in a sink having an outlet connected to a garbage disposal unit to keep silverware out of the outlet while permitting food scraps to be carried into the outlet by flowing water, comprising: an imperforate guard member of conical configuration having a diameter at the base thereof at least as great as the diameter of the sink outlet; and means for removably supporting said guard member within said sink in superposed relationship to said sink outlet, whereby said guard member may be easily removed from said sink for cleaning purposes and for direct access to the outlet, said supporting means coacting with said sink to position said guard member in a substantially concentric relationship with said sink outlet to prevent articles from dropping directly into said sink outlet from levels above said guard member and to intercept material thrown upwardly through the outlet by the mechanism of the disposal unit; said guard member presenting a resilient upper surface whereby said guard member forms a resilient impact element against which dishes may be struck to dislodge food particles carried thereby; said supporting means serving as a barrier spaced about said outlet to bar pieces of silverware from sliding edgewise into the outlet.

5. A guard for use in a sink having an outlet connected to a garbage disposal unit to keep silverware out of the outlet while permitting food scraps to be carried into the outlet by flowing water, comprising: a ring-shaped member of substantial thickness to rest removably in the sink in position surrounding the sink outlet to serve as a barrier to keep pieces of silverware from sliding edgewise into the outlet; a guard member of conical configuration having a diameter at the base thereof greater than the diameter of the opening of said ring-shaped member; and a plurality of rod elements spacedly carried by and projecting upwardly from said ring-shaped member mounting said guard member above said ring-shaped member in a substantially concentric relationship therewith with the apex of said guard member upwardly disposed.

References Cited in the file of this patent

UNITED STATES PATENTS

| | | |
|---|---|---|
| 2,615,636 | Powers | Oct. 28, 1952 |
| 2,701,644 | Griffiths | Feb. 8, 1955 |
| 2,753,571 | Draper | July 10, 1956 |
| 2,768,387 | Draper et al. | Oct. 30, 1956 |